(No Model.)

H. P. STULTZ.
HAIR DRESSING AND WASH FOR SILKS, LACES, EMBROIDERY, AND WOOLEN GOODS.

No. 293,372. Patented Feb. 12, 1884.

Witnesses.
John Flagg.
C. H. Seidel.

Inventor.
Henry P. Stultz.

United States Patent Office.

HENRY P. STULTZ, OF SANTA FÉ, TERRITORY OF NEW MEXICO.

HAIR-DRESSING AND WASH FOR SILKS, LACES, EMBROIDERY, AND WOOLEN GOODS.

SPECIFICATION forming part of Letters Patent No. 293,372, dated February 12, 1884.

Application filed November 20, 1883. (No specimens.)

*To all whom it may concern:*

Be it known that I, HENRY P. STULTZ, a citizen of the United States, residing at Santa Fé, in the county of Santa Fé and Territory of New Mexico, have invented a new and useful composition of matter to be used for hair and skin wash and for washing silks, laces, embroidery, and woolen goods, of which the following is a specification.

My composition of matter is made from soap-root by double distillation and concentration in the following manner, viz: Place one hundred (100) pounds of cleaned and crushed soap-root in mash-tub, adding water to cover. Let same remain in mash twenty-four (24) hours, when it is ready for distillation. From its soapy qualities the first distillation is not perfect. The second run through still renders the composition chemically pure and highly concentrated. One hundred (100) pounds of prepared soap-root, double distilled, gives about seven and one-half (7½) gallons of composition. I thus take the crude soap-root as previously prepared and subject it to a scientific distillation and concentration in a special copper still, freeing it of all gum and impurities, also preventing all danger from scorching or burning while being distilled by using scientific attachments to still, as hereinafter described, rendering the composition strictly concentrated and pure.

The accompanying drawings will more clearly set forth my plan of distilling and concentrating soap-root, in which—

Figure 1:
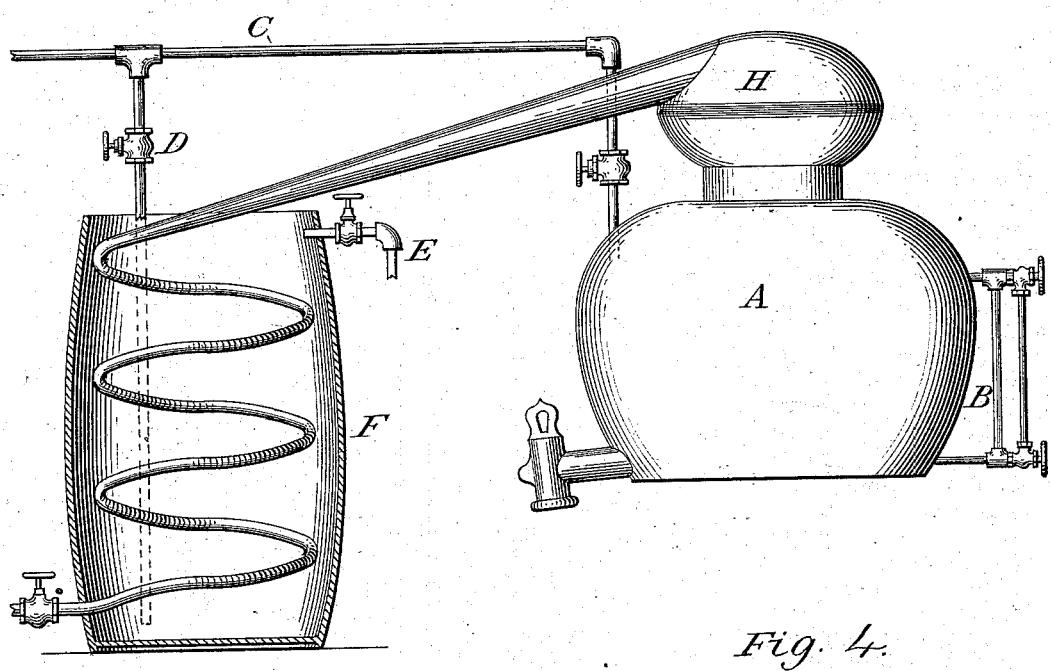
Figure 2:
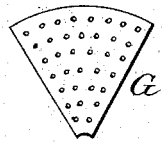
Figure 3:
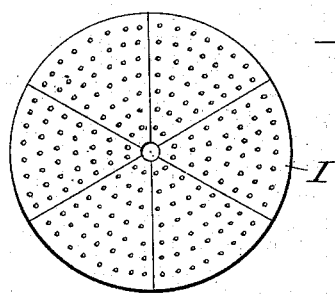
Figure 4:
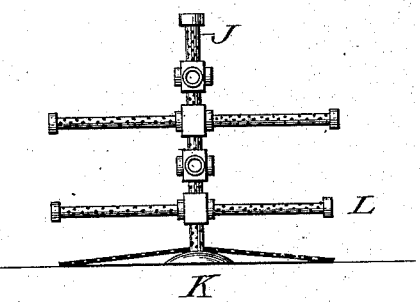

Figure 1 is a vertical section of copper still and attachments. Fig. 2 is a section of perforated loose bottom of still. Fig. 3 represents loose bottom when laid in still. Fig. 4 is a system of perforated tubing joined to a perforated upright having a base on which rests the removable bottom of still.

In the drawings, A is a special copper still, designed to be set in brick-work.

B shows a glass water-gage, attached to better ascertain when contents of still are run off.

A pipe, C, conveys water to still to immediately check foaming or "spurting," and also supplies water to bottom of condenser-tank F, through branch pipe D.

F is a condensing-tank filled with water, in which is stored seventy-five (75) feet of copper worm, through which is condensed the contents of the still.

G is a section of loose bottom of still, six of which form the bottom, as shown at I, Fig. 3, used for protecting still in running off crushed soap-root.

Fig. 4 represents perforated upright tube J, screwed into base K, on which loose bottom of still rests. Perforated projecting arms L screw into upright J, to greatly assist distillation by equally and rapidly distributing heat, water, and steam to all parts of the contents of the still. The whole of Fig. 4 is made up inside of still, after which the still is charged.

I am aware that soap-root in its crude state has been used for centuries for shampooing and cleansing purposes by the Spaniards, Mexicans, and Indians; but in all previous applications the crude gummy article accomplished the desire sought for, as far as I have reason to believe.

I am also aware that Letters Patent have been granted to parties for the manufacture and use of soap, &c., made from soap-root; but I am not aware that any composition of concentrated matter from soap-root has ever been made before by double distillation and concentration in the manner and for the purposes hereunto set forth.

What I claim, and desire to secure by Letters Patent of the United States, is—

The herein-described double-distilled and concentrated soap-root, to be used for hair and skin wash and for washing silks, laces, embroidery, and woolen goods.

HENRY P. STULTZ.

Witnesses:
JOHN FLAGG,
C. H. SEIDEL.